United States Patent [19]
Vanderhoff et al.

[11] Patent Number: 5,830,927
[45] Date of Patent: Nov. 3, 1998

[54] PRINTING INK COMPOSITIONS, METHODS FOR MAKING SAME AND USES THEREOF

[75] Inventors: John W. Vanderhoff, Bethlehem, Pa.; Philippe Huwart, Walhain, Belgium

[73] Assignee: Lehigh University, Bethlehem, Pa.

[21] Appl. No.: 906,468

[22] Filed: Aug. 5, 1997

Related U.S. Application Data

[63] Continuation of Ser. No. 229,557, Apr. 19, 1994, abandoned.

[51] Int. Cl.$^6$ ................................ C09D 11/10; C08F 2/50
[52] U.S. Cl. ................................ 522/81; 522/84; 522/85; 106/23 R; 106/22 C; 106/30 A; 106/31 R; 106/20 B
[58] Field of Search ...................... 522/3, 84, 85, 522/81; 106/20 B, 23 R, 23 C, 30 A, 31 R

[56] References Cited

U.S. PATENT DOCUMENTS

| H304 | 7/1987 | Vorrier et al. | 522/92 |
|---|---|---|---|
| 4,101,493 | 7/1978 | Nakagawa et al. | 260/29.6 |
| 4,177,177 | 12/1979 | Vanderhoff et al. | 260/29.2 |

*Primary Examiner*—Susan W. Berman
*Attorney, Agent, or Firm*—Samson B. Leavitt; Michael A. Leavitt; Michael R. Novack

[57] ABSTRACT

Aqueous based printing ink compositions adapted for use in gravure and flexographic printing on hydrophobic substrates are prepared by combining a low-viscosity resin emulsion having an average particle diameter of less than about 0.5 microns and comprised of hydrophobic, moisture resistant, adherent resin forming components with a pigment paste containing a water-soluble polymer. The printing inks are substantially devoid of volatile organic solvent.

16 Claims, No Drawings

PRINTING INK COMPOSITIONS, METHODS FOR MAKING SAME AND USES THEREOF

This application is a Continuation of application Ser. No. 08/229,557 filed Apr. 19, 1994, now abandoned.

The present invention relates to new and improved printing ink compositions and methods for making and using same, and in particular to ultra-violet radiation curable inks particularly suitable for use on plastic materials and which are ecologically friendly. More specifically, the present invention relates to printing ink compositions which are suitable to print by gravure or flexography on a variety of flexible substrates from metal foils (e.g. aluminum) to plastic films, and especially hydrophobic plastic film substrates such as polyethylene and other nonporous non-polar plastic materials. The printing inks are substantially devoid of volatile, organic solvents and the ink films formed on the substrates are extremely resistant to water, and have excellent adherence to the base material.

BACKGROUND OF THE INVENTION

Printing inks for use in flexographic and gravure printing have generally, for the last 60 years and almost predominantly for the earlier years in this period, utilized volatile solvent-based ink formulations following the invention by Adolph Weiss in the mid-1920's of the closed ink fountain (U.S. Pat. No. 1,631,169) which literally revolutionized rotogravure printing by opening the way to use much faster drying inks and thus much higher printing speeds.

Increased awareness of the detrimental effects of the rapid sweep of the industrialized world for power, money and higher levels of the "standard of living" on the environment and health and safety of all living things has, as we all know, led to increased governmental restrictions on all facets of our economy. Among these have been severe limitations on what can be vented to the atmosphere and in the context of this invention, on the amount of organic solvent vapor which can be vented. This has challenged those in the field of printing inks to lower and probably eventually totally eliminate any organic solvents in all printing inks and pastes. The response to this challenge has been the development of solventless inks; low-smoke low-odor inks, which can be used to replace the heatset inks; air-drying inks covered with a protective layer of alcohol-soluble polymer; thermally-catalyzed inks, which use blocked acid catalysts that become unblocked at high temperature; inks cured by infrared, ultraviolet light, and electron beam radiation; and water-based inks.

Solvent incineration systems have been developed to burn off the emitted solvents; however, these require additional fuel (natural gas or oil) and high temperatures. Solvent recovery units have also been developed to absorb, condense or otherwise recover the solvent; however, the solvent recovery is only partial, and some solvent escapes to the atmosphere. Solvent incineration has been used to burn off solvents from the paste inks used for lithographic and letterpress printing, and solvent recovery has been used to recover the solvent from the liquid inks used for flexographic and gravure printing. These latter inks often comprise 80% solvent and 20% pigment/binder mixture, so that four lbs. of solvent are vented to the atmosphere for each lb. of ink printed. Also, the solvent recovery units often allow some solvent to escape to the atmosphere. Thus, even the relatively small proportion of solvent that escapes is substantial in view of the considerable quantities of printing inks used.

A large volume of plastic film and foil is printed for packaging applications such as bread wrap. The inks used comprise polyamide, nitrocellulose, and other cellulosic polymer vehicles formulated with pigments (20%) and dissolved in organic solvents (80%). Generally, the plastic films are treated with corona discharge, exposed to solvents or flames, or etched with acids to form surface functional groups that enhance the adhesion of the inks. When printed, these inks give adequate, but not outstanding adhesion to the plastic film and foil, even at high humidity.

At about the turn of this decade, the Environmental Protection Agency asked printers and converters who use flexographic and gravure printing to substitute water-based inks for the solvent-based inks presently used. The current water-based inks work reasonably well for printing on absorbent substrates such as paper, paperboard, boxboard, and cardboard, and are widely used for these purposes; however, these inks do not adhere well to the smooth, nonporous, nonpolar plastic film and foil substrates; typically, the adhesion of the ink is poor, especially after exposure to high humidity. Thus, there were strong efforts to develop water-based inks that adhere well to these substrates.

Water-based inks for flexographic and gravure printing have been used for over thirty years but all contain from about 10% to 20% of a water-miscible solvent. Typically, the pigments are ground in a pigment grinding vehicle; the pigment dispersion thus formed is diluted ("let down") in another vehicle. The pigment grinding vehicles are usually water-soluble polymers; the letdown vehicles are usually water-reducible (water-dispersible) polymers prepared by emulsion polymerization using high concentrations of carboxyl-containing monomers, followed by neutralization. The water-soluble polymer is required for good printability; the inks will not transfer properly from one roll to another, or from a roll to the printing plate, if a water-soluble polymer is not present. The latex is required to give an ink film with good film properties, particularly toughness. The latexes comprise high-molecular-weight polymers that give good film properties; the solution polymers are limited to low-molecular-weight polymers because of the viscosity requirements. Again, as described above, these inks performed reasonably well on absorbent substrates but not so on smooth, nonporous, non-polar plastic film and foil substrates.

Prior art illustrative of the foregoing ink and coating compositions include the following: U.S. Pat. No. 3,048,530 describes a polyvinyl acetate latex paint, U.V. light is used during polymerization to accelerate the formation of the latex product. Photopolymerizable printing ink compositions are described in U.S. Pat. Nos. 3,801,329; 4,003,868; 4,014,771; 4,035,320; 4,056,453; and 4,271,258 and U.S. Statutory Invention Registration H304 (Published Jul. 7,1987). None of the compositions shown in these patents is aqueous-based. While they are volatile solvent-free, except for Publication H304, none teaches the composition as being useful in flexographic printing. Significantly, the H304 disclosure teaches the great desirability of the use of a primer coating of polyvinylidene chloride or a solvent-reduced resin solution (e.g. polyester, vinyl, acrylic ester, or cellulose acetate butyrate). Water-based, radiation curable compositions are described in U.S. Pat. No. 4,339,566 (textile printing); U.S. Pat. No. 4,360,541 (self-pigmented protective coatings) and U.S. Pat. No. 5,045,435 (for dip coating and screen printing). None of these water-based compositions is taught as having utility in flexographic printing.

U.S. Pat. No. 5,028,262 discloses ink compositions which are aqueous dispersions of a water-dispersible polymer, a disperse dye and a dihydroxy benzophenone, the latter functioning to stabilize the dye with respect to precipitation.

OBJECTS OF THE INVENTION

It is therefore, a primary object of this invention to provide ink compositions which are water-based and volatile organic solvent-free and which yield strong, adherent, water-resistant printed films on hydrophobic, flexible substrates.

It is another object of this invention to provide aqueous-based, solvent-free printing inks adaptable to give strong, adherent and water-resistant films on smooth, non-porous, non-polar flexible metal foil and plastic film substrates.

It is still another object of this invention to provide water-based and organic solvent-free printing inks which are ultra-violet light curable to give strong, adherent and water-resistant films on metal and hydrophobic plastic substrates.

It is a further object of this invention to provide processes of making and using the foregoing compositions.

Other objects and advantages will appear hereinafter as the description proceeds.

SUMMARY OF THE INVENTION

The objects of this invention are attained by providing printing ink compositions which are ultra-violet radiation curable water-based formulations, substantially devoid of volatile, organic solvents, which have a viscosity of from about 10 to 50 poises, a generally necessary criterion for the use of inks in gravure and flexographic printing processes, and which include a relatively low-molecular weight hydrophobic vinyl-functional polymer (oligomer) binder which is curable by ultra-violet radiation, using conventional photo initiators, to a water-insoluble, hydrophobic form. The oligomer latex (emulsion) is provided in very stable form by direct emulsification of the oligomer in water using an emulsifier-coemulsifier combination whereby the emulsified particles are substantially below one micrometer in size [one micron ($\mu$)] and below the critical particle diameter which corresponds to a particle diameter which in practice will never settle. One criterion for settling as discussed by Overbeek in "Colloid Science, Vol. 1" H. R. Kruyt, Editor, Elsevier, Amsterdam, 1952 p.80, is that a sedimentation rate of 1 mm in 24 hours according to Stoke's Law will be offset or nullified by the thermal convection currents and Brownian motion within the sample. Using Stoke's equation to determine V (rate of settling):

$$V = \frac{2ga^2(d_1 - d_2)}{9\eta}$$

wherein a=radius of sphere (e.g. particle), $d_1$ and $d_2$=densities of the sphere and medium respectively, $\eta$=the coefficient of viscosity, and g is the acceleration due to gravity (free fall).

V will be in cm/sec if g is in cm per sec$^2$, a in cm, $d_1$, and $d_2$ in g per cm$^3$ and $\eta$ in degree-sec per cm$^2$ or poises; for polystyrene which has a density of 1.050 g/cm$^3$, the critical diameter is 0.65$\mu$.

The emulsifier-coemulsifier direct emulsification technique such as described in U.S. Pat. No. 4,177,177 (Vanderhoff et al), which is hereby incorporated by reference, readily produces particle sizes averaging well below 0.65$\mu$, e.g. less than about 0.5$\mu$, preferably about 100–400 nm (nanometers). The provision of latices with particle sizes this small not only results in outstanding stability of the latex per se but also of the finally formulated ink, and as a further great advantage, one is enabled to effect excellently coalesced films. A further advantage, in the context of coalescing films of the instant aqueous systems, is that the water-air interfacial tension (which can be as high as 72 dynes/cm in pure water and as high as 35–dynes/cm in the presence of excess surfactant) is directly related to the force involved in causing particles to coalesce into film and is much greater than organic solvent solution-air interfacial tensions, (e.g. 10–15 dynes/cm). Thus because of these greater forces, more viscous oligomer binders can be used.

An additional component of the resin latex which it is generally preferred to employ to effect the strongest and most deformation-resistant continuous phase of the printed ink film is a cross-linking, polyfunctional monomer.

A further optional but often desirable component is a monofunctional monomer. Often one may use either a cross-linking monomer or a monofunctional monomer (or both).

The polymer emulsification process using the emulsifier-coemulsifier combination is conveniently carried out as described in U.S. Pat. No. 4,177,177. A solution of the resin(s) is stirred into the water phase containing the surfactant/emulsifier mixture. This produces a crude emulsion with 1–100$\mu$ diameter droplets. The crude emulsion is then subjected to the action of comminuting forces such as homogenization or ultra-sonification which results in particle diameters of generally 0.1 to 0.4 microns. The solvent used to form the resin solution is removed by vacuum steam distillation. To this latex is added the necessary photo initiator to provide the free radicals to "set" the resin composition to its final insoluble form. The well-known and conventional photo initiators are available for this function. This hydrophobic oligomer emulsion is later referred to and/or employed as the "let down" vehicle.

The colorants used in the present compositions are water-based insoluble pigments or dyestuffs which are generally prepared by grinding (i.e. dispersing) the pigment in water using a water soluble polymeric grinding vehicle; then "letting down" this pigment dispersion with the "letdown" vehicle i.e. the U.V. curable hydrophobic oligomer latex emulsion; a water-soluble or emulsifiable polymer (thickener) is added in small concentrations, to control the rheological properties of the ink.

Other adjuvants may be added to the pigment batch to improve properties, e.g. mar resistance. Surprisingly, adding a aqueous wax emulsion to the pigment batch before adding the U.V. radiation curable resin binder formulation results in a marked improvement in mar resistance of the cured ink film on the hydrophobic substrate in contra-distinction to the results obtained when a wax emulsion is added to a conventional latex coating formulation. In the latter instance, adhesion of the latex-derived film is significantly adversely affected whereas in the present invention it is found that by curing the resin binder in situ, the adhesion of the ink film is not so affected.

A further surprising benefit of the present compositions lies in the fact that in the printing process it is not necessary to pre-dry the ink on the substrate as a separate step before curing the ink with ultra-violet radiation. In the curing step it is feasible with the conventional equipment now used (e.g. 200 watt/inch Hanovia Lamps) to effect water removal (i.e. drying) and "curing" of the film in a single step.

A further benefit deriving from the unique ink compositions of the present invention lies in the attainment of high-strength film with minimum tendency to delaminate from the underlying flexible plastic film. Since the strength of the cured ink films depends upon the resin binder used and the efficiency of the particle coalescing process, it is patently clear that the strength of the binder per se depends on its composition as well as the degree of curing. Increasing binder strength as by chemical composition, cross-linking, etc. would in most cases decrease flexibility and could in an extreme case increase delamination from the substrate. Since this tendency is lowered as the ink film thickness decreases and since the printing ink compositions of the present invention enable production of ink printing and coating thicknesses generally as low as about 2 microns, we find this "catch 22" situation to be neutralized with the present compositions and printing processes using them.

DETAILED DESCRIPTION OF THE INVENTION

The primary, film-forming ("binder") resins of the printing ink composition of this invention are low-molecular weight hydrophobic oligomers having a molecular weight of from about 400 to 10,000 and are generally fluid-to-viscous liquids with viscosities ranging up to about 25000 cps @ 25° C. Suitable oligomers include as a preferred group—vinyl functional oligomers, hydorcarbon based oligomers and derivatized hydrocarbon oligomers. The vinyl-functional oligomers are generally acrylic or methacrylic acid esters of epoxide resins, urethanes, polyesters and alkyds. Specific products include amine-modified diacrylates of bis-phenol A type epoxide resins (e.g. Novacure 3600, MW 548, 1300 cps viscosity at 65° C.); acrylated epoxy resins (e.g. Novacure 3700-25R, MW 524, viscosity 14000 cps @ 25° C., similar to Novacure 3600 but including 25% by wt of tripropyleneglycol diacrylate); acrylic esters of urethane, e.g. aliphatic urethane diacrylate (Ebecryl 230); aliphatic urethane diacrylate diluted 10% with tetraethylene glycol diacrylate (TTEGDA) (Ebecryl 4830); multi-functional aromatic urethane acrylate (Ebecryl 220); Ebecryl 3700 with 20% trimethylol-propane triacrylate (TMPTA).

It should be noted that the first commercial oligomers of these types were identified as "Hi-Tek", which was changed to "Novacure", then "Radcure", and currently "Ebecryl" (since about May 1993).

For some other specific urethane acrylates see, U.S. Pat. No. 4,339,566, and U.S. Statutory Invention Registration #H304, which are incorporated by reference. Other specific epoxy acrylates are disclosed in the prior art. Among the above types of preferred oligomers, an illustrative structural formula is represented by the following for Novacure 3700-25R:

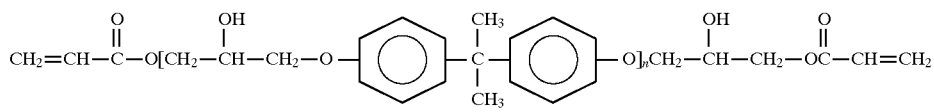

wherein n is the value needed to provide a MW of 524.

Further useful but only illustrative oligomers are Ebecryl 220—a multi-functional aromatic urethane acrylate; Ebecryl 810—a multi functional polyester acrylate; Ebecryl 770—an acid functional polyester acrylate diluted 40% with Hydroxyethyl methyl diacrylate (HEMA), Escorez EC 346R (Exxon) a hydrocarbon resin prepared from a petroleum fraction of $C_4$–$C_7$ hydrocarbons (70% aliphatic—30% aromatic) cationically polymerized with residual double bonds—brittle yellow solid, density about 0.6 g/cm$^3$; butadiene-styrene latex; carboxy-terminated polybutadiene oligomer, MW5600—viscous liquid, soluble in dichloromethane (Scientific Polymer Products).

The aforementioned hydrocarbon resin, butadiene-styrene latex and carboxy-terminated polybutadiene oligomer differ from most of the previously described oligomers in not being acrylic acid esters of oligomeric epoxide resins, urethanes, polyesters, alkyds and the like, and in containing somewhat less reactive residual double bonds. Their use in this invention as substitutes or equivalents of the said "vinyl-functional oligomers" is described below in Examples 7, 8, 9 and 11.

The emulsifiers used to prepare the oligomer emulsion (latex) may comprise any of the known non-ionic, anionic, cationic, amphotenic, zwitterionic, etc. surfactants as for example fully described in U.S. Pat. No. 3,762,859, column 3, line 6 to column 8, line 15 which description is incorporated herein by reference thereto.

Preferred are the anionics, particularly the alkali (Na, K, Li) $C_{10-20}$ alkyl sulfates such as sodium lauryl sulfate and sodium hexadecyl sulfate; the cationics, particularly the quaternary ammonium halides such as $C_{10}$ to $C_{20}$ alkyl (e.g. octadecyl) piperidine bromide and $C_{10}$ to $C_{20}$ alkyl (e.g. hexadecyl) tri lower ($C_1$ to $C_4$) alkyl (e.g. methyl) ammonium bromide; and the nonionics, particularly the exthoxylates of higher M.W. (>$C_8$) reactive hydrogen-containing compounds, e.g. $C_{10-20}$ alkanols, $C_{8-18}$ alkyl phenols and $C_{10-20}$ fatty acids with from about 3 to 50 or more (e.g. 5–50; 5–60 etc.) moles of ethylene oxide (E.O.) per mole of such compound (alcohol, acid or phenol). Specific examples are octylphenol and 40 E.O.; lauryl alcohol and 12 E.O., tall oil fatty acid and 20 E.O. Generally, any oil-in-water emulsifying agent is satisfactory.

The co-emulsifier may be a hydrocarbon, alcohol, ester, amine, halide, ether, etc. Preferred are those with an aliphatic hydrocarbyl-containing moiety of at least 8 carbon atoms, water-insoluble (less than 10$^{-3}$ liter of water), with molecular weights not exceeding about 5000, preferably 2000 and more preferably from about 110 to 500, especially alkanes and alkanols. These compounds may be aliphatic hydrocarbons such as n-octane, n-decane,n-octadecane, eicosane, 1-dodecene, 3-octyne, dodecylcyclohexane, tetradecanol, hexadecanol (cetyl alcohol), 1-hexaeicosanol, cetyl acetate, hexadecylamine, octadecylamine, hexadecyl chloride, octyl ether, cetyl ether, methyl octanoate, octyl caproate, ethyl stearate, glyceryl tristearate, coconut oil, olein and the like.

The cross-linking compounds (polyfunctional monomers) include by way of illustration only, trimethylol propanetriacrylate (TMPTA), pentaerythritol tetracrylate (PETA), hexanediol diacrylate (HDODA), tetraethylene glycol diacrylate (TTEGDA), tripropylene glycol diacrylate (TPGDA), 1,4-butanediol diacrylate (BDODA), glyceryl propoxylate triacrylate (GPTA), divinyl benzene and trialkyl cyanurate.

Any monofunctional monomer may be used where it's use is indicated or desirable. Examples include 2-ethylhexyl acrylate, decyl acrylate, N-vinyl-2-pyrrolidone and vinyl acetate. Many, many others may be used but constraints of odor, volatility and reactivity make many of these others less desirable.

Mixtures of different "binder" resins, polyfunctional and monofunctional monomers may, of course, be used as well.

The photo initiators needed to effect curing, of the total resin system are well known and include inter alia, acetophenones and benzophenones, xanthones, and benzoin derivatives. Reference is made to U.S. Pat. Nos. 3,801,329; 4,003,868 and 4,014,771 and U.S. Statutory Invention Legislation H304 published Jul. 7, 1987 for illustrative specific initiators, and their disclosures are herein incorporated by reference thereto.

The following photoinitiators besides the 2,2'-diacetoxyacetophenone (Aldrich) have been tested in the formulations of this invention in 1–2% concentration based on oil phase:

1. KIP 100 F (Fratelli Lamberti spa);
2. KIP 37 (Fratelli Lamberti spa);
3. Irgacure 500 (Ciba-Geigy);
4. Irgacure 369 (Ciba-Geigy);
5. Darocur 4665 (Merck).

All of these photoinitiators showed positive results. The Irgacure 369 gave a fast curing rate, but, with the clear resins, developed a yellow color. Some of these photoinitiators were difficult to incorporate into the miniemulsion particles. In these cases, the photoinitiator was emulsified in water using Triton X-200 (octylphenol-polyoxyethylene adduct (4 moles ehtylene oxide) with a sulfate endgroup; Rohm & Haas); this emulsion was subjected to untrasonification and then added to the miniemulsion.

The concentration of the components of the resin emulsion may vary widely depending on the nature of the binder(s), the intended substrate and the pigment paste which is used. Generally the oligomer binder(s) content may vary from 5 to 60% by weight, preferably 10 to 50% by weight and more preferably 15 to 40% by weight based on the weight of the emulsion composition. Illustrative concentrations are (1) 19% Acrylated epoxy viscosity 1300 cps at 65° C.; (2) same as (1) plus 5% TMPTA (trimethylol propane:triacrylate); (3) same as (2) plus 15% 2-ethylhexyl acrylate (4) 22% acrylated epoxy (viscosity 14000 cps @ 25° C.; (5) same resin as (4) at 20% plus 5% TMPTA ; (6) same as (5) plus 15% 2-ethylnexyl acrylate; (7) hydrocarbon ($C_4$ to $C_7$—70% aliphatic 30% aromatic) resin—40%; (8) 75/25 butadiene-styrene copolymer—18%; (9) same as (1) plus 4% tetraethylene glycol diacrylate; (10) same as (9) plus 10% vinyl acetate; (11) same as (9) plus 12% N-vinyl-2-pyrrolidone; (12) same as (4) plus 5% divinylbenzene; (13) same as (7) plus 2% divinylbenzene; and (14) same as (8) plus 15% 2-ethylhexyl acrylate.

The surfactant emulsifier(s) (EM) content used in the emulsion preparation may vary from about 0.1% to about 15%; preferably about 0.2 to about 10% and more preferably from about 0.25 to about 5% by weight based on the weight of water. The amount of co-emulsifier (Co-EM) will generally be related to the amount of surfactant emulsifier with suitable molar ratios of Co-EM to EM within the range of about 1:4 to 4:1. Some highly preferred combinations are sodium lauryl sulfate/Cetyl alcohol in a 1:4 Molar Ratio (about 1:3.4 wt. ratio) and sodium lauryl sulfate/hexadecane in a 1:3 molar ratio (weight ratio about 1:2.8).

The amount of photo initiator may vary from about 0.5 to about 10% by weight based on the weight of oligomer(s) and monomer(s), and preferably from about 1 to about 5% by weight.

It is often desirable to add a water soluble polymer to the resin emulsion, to promote adhesion to the substrate, prevent coagulation of the pigment paste formulation which is to be added to the emulsion to prepare the final printing ink, prevent pigment settling, enhance pigment dispersion and adjust viscosity of the final printing ink. Suitable polymers include polyvinyl pyrrolidone, polyacrylamide, solubilized acrylic acid-vinyl acetate/vinyl alcohol inter polymers and the like. The selection of the water soluble polymer will be guided by the substrate with amounts varying from about 1 to about 20% by weight based on tile weight of the emulsion with about 5 to about 15% preferred, e.g. 5%, 10%, 12% and 15%.

The second major component of the printing ink is, of course, the pigment which can be any pigment whatsoever and literally thousands are available. The pigment pastes are prepared in general, illustratively, using three steps:

1. Neutralization and solubilization of the grinding vehicle;
2. Addition of the pigment to the solution of grinding vehicle;
3. Grinding of the pigment dispersion in a sand mill.

The grinding vehicles were generally low-molecular-weight hard acrylic polymers, e.g., Joncryl 678. The composition of this polymer probably comprised a copolymer of a carboxyl-containing monomer with a hard monomer, e.g., styrene or alpha-methylstyrene. These copolymers, often sold as a powder or flake, were mixed with an aqueous solution of ammonia or an organic amine to neutralize the carboxyl groups and solubilize the copolymer. The resulting solution or dispersion was then used as the grinding vehicle.

The dry, powdered pigment was added stepwise with stirring to the solution or dispersion of the grinding vehicle, and this dispersion was homogenized into a smooth paste, called the pigment masterbatch.

This pigment masterbatch was then ground in a sand mill (Coball Mill, Fryma AG, Rheinfelden, Switzerland), which used glass or zirconium beads of about 2.0–2.5 mm diameter to grind the pigments.

The fineness of grind was measured using a NPIRI Production Grindometer grind gauge. This comprised a rectangular steel block with a tapered trough, ranging in depth from 0 to 25 micrometers. A sample of dispersion was placed in the deep end of the trough and drawn down with a steel drawdown blade. Pigment aggregates of a size equal to the depth of the trough were caught under the blade and made a "scratch" in the dispersion. The dispersions were rated according to the number and size of these aggregates.

The above described hydrophobic oligomer emulsion was then added as let-down vehicle to the resulting ground pigment master batch. A water soluble polymeric thickener (1–10% of final ink) must be added to the pigment masterbatch/let-down vehicle mixture to adjust the rheology properties of the final ink to sustain a rapid decrease in viscosity with increasing rate of shear to a plateau value of about 2–5 poises at high shear rate of about $10^3$–$10^4$ reciprocal seconds, followed by a corresponding increase in viscosity (e.g. to about 10,000 poises) upon cessation of the shear. This polymer can be a solution polymer or a water-reducible polymer because the thickener functions according to its interactions with itself and the colloidal pigment and latex particles. Its molecular weight can range from very low (e.g., 1,000–2,000) to very high (over 200,000). Without this thickener vehicle, the final inks did not wet the substrate, i.e. they tended to dewet and crawl and retreat after application to the plastic or metal flexible, non-porous, non-polar hydrophobic substrate with a wire-wound rod or Pamarco handproofer (poor drawdowns or rollouts).

Illustrative commercially available water-soluble polymers for this thickening purpose include S. C. Johnson's Jonacryl 67, 537, 678, 8050, 8051, SCX-7630; Varnishes 8866 and 9562; Rohm & Haas Primal E-1941 and Enorex AG's Elotex 2030.

The amount of pigment in the printing ink may obviously vary but generally inks are formulated to about 5–25%, preferably 10–20%, by weight of pigment with about 13% by weight being a generally used level.

The following examples will serve to illustrate the present invention without being deemed limitative thereof. Parts and proportions referred to herein and in the appended claims are by weight unless otherwise indicated.

EXAMPLE 1

A composition of the following ingredients is prepared:

| Ingredient | Parts by Weight |
|---|---|
| Water | 60.00 |
| Novacure 3600 | 19.20 |
| Trimethylolpropane triacrylate crosslinking monomer | 4.80 |
| Toluene solvent | 16.00 |
| Sodium lauryl sulfate emulsifier | 20 mM* |
| Cetyl alcohol co-emulsifier | 80 mM* |
| 2,2¹-diethoxyacetophenone photo initiator | 1.0%** |

*based on water
**based on prepolymer/polyfunctional monomer mixture

The general production procedure involves the initial preparation of the toluene solution of the epoxide resin and triacrylate cross linking monomer. A separate aqueous emulsifier solution is prepared (water and sodium lauryl sulfate and cetyl alcohol agitated at 70° C. for 2 hours and then sonified for 2 minutes at a power setting of 7 (50% duty cycle) in a Branson Sonifier Disruptor W-350). This aqueous solution is then mixed with the toluene solution using a magnetic stirrer for 1 hour and further sonified for 2 minutes similarly as done separately for the aqueous emulsifier portion. The toluene is then removed by vacuum steam distillation. The average droplet size in the emulsion is less than 0.3 microns.

EXAMPLE 2

Ink formulations (A to MM) are prepared as shown in Table A using Emulsions as prepared in Example 1. The Table indicates illustrative substrates and pigment pastes. The inks are drawn down on the "velvet" side of polycarbonate films, cured by ultraviolet light, and the adhesion measured using a simple and acceptable Scotch Tape Test, i.e., by pressing the tape on the cured ink film and pulling it off; the failure of the ink to separate from the polycarbonate film is indicative of good adhesion. The test is repeated after aging the sample for three days at 100% relative humidity. All of the combinations on polycarbonate show good adhesion.

The polypropylene films are preferably treated with corona discharge as are the low and high density polyethylene films before application of the ink film. This is conventional in industrial coating practice since the technique enhances adhesion ostensibly through the generation of functional groups on the polymer film. The usual practice is to treat the film immediately before coating since the treatment is not permanent. All printings on the polypropylene and the high and low density polyethylene films give satisfactory results.

TABLE A

Composition of Printing Inks

Parts by Weight

| | Plastic Film Substrate | Polymer Emulsion | Aqueous Pigment Paste | | Water-Soluble Polymer | |
|---|---|---|---|---|---|---|
| A | Polycarbonate | 49.5 | Red 9045 | 45.0 | Primal E-1941 | 5.5 |
| B | Polycarbonate | 21.8 | White 9335 | 75.8 | Varnish 9562 | 2.4 |
| C | Polycarbonate | 36.0 | Black 9366 | 60.0 | Varnish 9562 | 4.0 |
| D | Polycarbonate | 45.0 | Red 6754 | 50.0 | Primal E-1941 | 5.0 |
| E | Polycarbonate | 45.0 | Red 9563 | 50.0 | Primal E-1941 | 5.0 |
| F | Polycarbonate* | 44.5 | Carmin 9564 | 50.6 | Primal E-1941 | 5.0 |
| G | Polycarbonate | 35.0 | Black 9565 | 61.2 | Joncryl 537 | 3.4 |
| H | Polycarbonate | 52.0 | Red 8049 | 42.0 | Primal E-1941 | 6.0 |
| I | Polycarbonate | 55.0 | Blue 9175 | 28.0 | Primal E-1941 | 7.5 |
| | | | | | Varnish 8866 | 9.5 |
| J | Polycarbonate | 50.5 | Blue 7287 | 44.0 | Primal E-1941 | 5.5 |
| K | Polycarbonate | 52.0 | Yellow 9184 | 42.0 | Primal E-1941 | 6.0 |
| L | Polycarbonate | 47.0 | Carmin 9043 | 48.0 | Primal E-1941 | 5.0 |
| M | Polycarbonate | 36.0 | Black 9042 | 60.0 | Primal E-1941 | 4.0 |
| N | Polycarbonate | 50.5 | Blue 6755/N | 44.0 | Primal E-1941 | 5.5 |
| O | Polycarbonate | 59.5 | Green 6876 | 34.0 | Primal E-1941 | 6.5 |
| P | Polycarbonate | 45.0 | Red 9563 | 50.0 | Primal E-1941 | 5.0 |
| Q | Polypropylene | 21.8 | White 9335 | 75.8 | Joncryl 8050 | 9.6 |
| R | Polypropylene | 52.0 | Red 8049 | 42.0 | Primal E-1941 | 6.0** |
| S | Polypropylene | 45.0 | Red 6754 | 50.0 | Joncryl 537 | 5.0 |
| T | Polypropylene | 55.0 | Blue 9175 | 28.0 | Varnish 8866 | 9.5 |
| | | | | | Joncryl 537 | 7.5 |
| U | Polypropylene | 50.5 | Blue 7287 | 44.0 | Joncryl 537 | 5.5 |
| V | LD-polyethylene | 38.5 | White 9335 | 48.1** | Joncryl 8050 | 9.6 |
| W | LD-polyethylene | 50.2 | Red 8049 | 40.4** | Joncryl 8050 | 5.6 |
| X | LD-polyethylene | 38.5 | Red 67543 | 48.1** | Joncryl 8050 | 9.6 |
| Y | LD-polyethylene | 52.9 | Blue 9175 | 26.9** | Varnish 8866 | 9.1 |
| | | | | | Joncryl 8050 | 7.2 |
| Z | LD-polyethylene | 48.5 | Blue 7287 | 42.3** | Joncryl 8050 | 5.4 |
| AA | HD-polyethylene | 38.5 | White 9335 | 48.1** | Joncryl 8051 | 9.6 |
| BB | HD-polyethylene | 50.2 | Red 8049 | 40.4** | Joncryl 8051 | 5.6 |
| CC | HD-polyethylene | 38.5 | Red 6754 | 48.1** | Joncryl 8051 | 9.6 |

TABLE A-continued

Composition of Printing Inks

| | Plastic Film Substrate | Polymer Emulsion | Aqueous Pigment Paste | | Water-Soluble Polymer | |
|---|---|---|---|---|---|---|
| DD | HD-polyethylene | 48.5 | BLue 7287 | 42.3** | Joncryl 8051 | 5.4 |
| EE | HD-polyethylene | 34.6 | Black 9366 | 57.7** | Joncryl 8051 | 3.8 |
| FF | HD-polyethylene | 56.0 | Yellow 9184 | 32.0**** | Joncryl 8051 | 6.2 |
| GG | HD-polyethylene | 56.6 | Orange 9185 | 32.4** | Joncryl 8051 | 6.3 |
| HH | HD-polyethylene | 34.4 | Black 9042 | 57.3** | Joncryl 8051 | 4.5 |
| II | HD-polyethylene | 33.6 | BLack 9565 | 58.8** | Joncryl 8051 | 3.8 |
| JJ | HD-polyethylene | 48.1 | Blue 6755/N | 42.0** | Joncryl 8051 | 6.1 |
| KK | HD-polyethylene | 57.1 | Green 6876 | 32.7** | Joncryl 8051 | 6.3 |
| LL | HD-polyethylene | 43.3 | Red 9563 | 48.1** | Joncryl 8051 | 4.8 |
| MM | HD-polyethylene | 47.6 | Carmin 9564 | 38.1*** | Joncryl 8051 | 9.5 |

LD polyethylene = low density polyethylene
HD polyethylene = high density polyethylene
*or Joncryl 537 coalesced with Dowanol DPM (diproplyene glycol methyl ether)
**+3.8 pts W8853 aqueous wax emulsion containing 28.5% water
***+4.8 pts W8853 aqueous wax emulsion containing 28.5% water
****+5.8 pts W8853 aqueous wax emulsion containing 28.5% water The following Table B gives by way of illustration only the compositions of some of the aqueous pigment pastes (pigment/grinding vehicle) useful and specified in the examples and description herein.

TABLE B

| Paste Color | Number | Composition |
|---|---|---|
| White | 9335 | 46.0% TiO$_2$ pigment 2063 (Kronos) 11.0% Joncryl 678 9.5% Joncryl 90 |
| Yellow | 9184 | 31.0% Yellow 73 Acetanil 7312 (Cappelle) 16.0% Joncryl 678 |
| Orange | 9348 | 29.0% Orange 13 Diacetanil 1323 (Cappelle) 16.0% Joncryl 678 |
| Red | 9563 | 26.0% Lake Red 153:1 5310C (Cappelle) 12.5% Joncryl 678 7.0% Joncryl 90 |
| Red | 8049 | 32.0% Red 48:2 Eljon Rubine 2BRC (European Colour) 11.0% Joncryl 678 |
| Carmine | 9564 | 17.0% Rubine Red 57:1 4BP (European Colour) 8.5% Lake Red 53:1 5316C (Cappelle) 12.5% Joncryl 678 6.5% Joncryl 90 |
| Fanal Rose | 6754 | 20.0% Fanal Rose CF D 4810 (BASF) P Red 169 12.0% Joncryl 678 |
| Phthalo Blue | 9175 | 46.0% Microfast SMFI Blue 15:3 (Toyo Ink) 12.0% Joncryl 678 |
| Alkali Blue | 7287 | 18.2% Powdura Blue AP3600 Blue 19 (Sherwin Williams) 16.5% Joncryl 678 |
| Violet | 6755N | 18.2% Violet lumiere 2744 P. Violet (Cappelle) 16.5% Joncryl 678 |
| Green | 6876 | 38.0% Phthalo Green D-8730 (BASF) P Green 7 13.0% Joncryl 678 |
| Black | 9565 | 24.0% Printex 30 11.0% Joncryl 678 6.0% Joncryl 90 |
| Black | 9042 | 24.0% Printex 30 (degussa) 13.5% Joncryl 8004 |
| Black | 9368 | 25.0% Spezialschwartz 250 (Degussa) 11.0% Joncryl 678 6.0% Joncryl 90 |

The following supplements the descriptions of the water-soluble polymers used as pigment grinding vehicles for the pigment pastes or as thickeners to adjust the rheology of the model printing inks of this patent application.

The water-soluble polymers generally comprise two types: 1. low-molecular-weight (e.g. as low as 1,000–2,000 up to about 60,000) acrylic solution polymers used as grinding vehicles; 2. low to high-molecular-weight (e.g. 1,000 up to about 100,000 to 1,000,000 or more) carboxyl-containing polymer emulsions used (as thickeners) to adjust the rheology of the model printing inks.

The following samples were prepared by solution polymerization for use primarily as grinding vehicles.

Joncryl 67 (S. C. Johnson)—solid flake; carboxyl-containing styrene/acrylic resin that dissolves in water upon neutralization; believed to be styrene/acrylic acid copolymer; MW 10,000; Acid Number 190; $T_g$ 70° C.; neutralized solution used as a grinding vehicle;

Joncryl 678/679 (S. C. Johnson)—solid flake; carboxyl-containing styrene/acrylic acid copolymer that dissolves in water upon neutralization; contains some alpha-methylstyrene; MW 8000; Acid Number 200; $T_g$ 85° C.; solution recommended as a pigment grinding vehicle; also available as an aqueous 35%-solids solution (Joncryl 61) neutralized with ammonia and containing some ethylene glycol and isopropanol.

Joncryl 8004—translucent colloidal solution polymer prepared by solution polymerization and partially-neutralized with ammonia; 32.5% solids; viscosity 50–300 cps; polymer MW 60,000; pH 7.7; Acid Number 85; Minimum Film Formation Temperature <5° C.; $T_g$ 21° C.; recommended for use as the sole binder in water-based flexographic inks for corrugated cardboard, multiwall paper sacks, and newspaper printing.

Elotex Print 2030 (Elotex AG)—low-viscosity acrylic copolymer solution; 30% solids (56% water, 14% ethanol); pH 8.9; surface tension 34 dynes/cm; recommended as a vehicle for printing inks for poly (vinyl chloride), polyethylene, polypropylene, and polyester films.

| Varnishes 8866 and 9562 (Martin-Huwart) | | |
|---|---|---|
| | Parts | |
| Ingredient | Varnish 8866 | Varnish 9562 |
| Water | 49.20 | 25.215 |
| Joncryl 90 | — | 29.23% |
| Joncryl 679 | 35.00 | 25.58 |
| Isopropanol | 5.00 | 4.385 |
| Propylene glycol | 2.00 | — |
| Dimethylethanolamine | 4.50 | — |
| Aminopropanol 95 | — | 1.75 |
| Ammonia (25% aqueous) | 4.50 | 4.385 |
| Anti-foam agent (50% aqueous) | 0.20 | 0.365 |
| Water | — | 9.09 |
| Total | 100.40 | 100.00 |

To prepare the Varnish 8866, the Joncryl 679 was mixed with the water and stirred; the isopropanol and propylene glycol were added slowly with stirring, followed by the dimethylethanolamine and ammonia to neutralize the Joncryl 679, along with the anti-foam agent. To prepare the Varnish 9562, the Joncryl 90 was added to the water with stirring; then, the Joncryl 679, isopropanol, antifoam agent, aminopropanol, and ammonia were added in that order; the amount of ammonia was adjusted so as give a pH of 9.2; then, the second charge of water was added after the Joncryl 90 and Joncryl 679 were completely neutralized. The Varnish 8866 and Varnish 9562 were then used in the model ink formulations.

The following vehicles were prepared by emulsion polymerization using high concentrations of carboxyl-containing monomers and were generally intended for use as "thickeners" to control the rheology of the final printing ink.

Joncryl 90 (S. C. Johnson)—semi-translucent polystyrene emulsion prepared using as emulsifier a low-molecular-weight alkali-soluble styrene/acrylic acid copolymer (which is the source of the Acid Number); 44% solids; viscosity 200 cps; pH 8.2; polymer MW >200,000; Acid Number 65; Minimum Film Formation Temperature >86° C.; $T_g$ 110° C.

Joncryl 8050—semi-translucent partially-neutralized acrylic copolymer (acrylate and methcrylate esters) emulsion using as emulsifier a low-molecular-weight alkali-soluble styrene/acrylate copolymer (which is the source of the Acid Number) as well as a nonionic emulsifier; 42% solids; pH 7.8; viscosity 500 cps; polymer MW >200,000; Acid Number 91; Minimum Film Formation Temperature, <-5° C.; $T_g$ -18° C.; recommended as a vehicle for single-vehicle inks and overprint lacquers.

Joncryl 8051—semi-translucent partially neutralized acrylic polymer emulsion; 45% solids; viscosity 700 cps; polymer MW >200,000; Acid Number 83; Minimum Film Formation Temperature <-5° C.; $T_g$ -23° C.; recommended for water-based flexographic and gravure inks printed on flexible films and aluminum foil.

Joncryl SCX 2630—translucent partially-neutralized crosslinked (with bifunctional acrylate) polymer emulsion using as emulsifier a low-molecular-weight alkali-soluble styrene/acrylic copolymer (which is responsible for the Acid Number) as well as a nonionic emulsifier; 49% solids; pH 8.5; viscosity 1600 cps; $T_g$ -35° C.; recommended as a water-based low VOC (volatile organic solvent content ) vehicle for printing on high-slip low-density polyethylene film.

Joncryl 537 (S. C. Johnson)—carboxyl-containing 40:60 styrene/acrylic copolymer emulsion (acrylic part is a mixture of acrylate and methacrylate esters) using as emulsifier a low-molecular-weight alkali-soluble styrene/ acrylic copolymer, as well as anionic and nonionic emulsifiers; 46% solids; viscosity 100–200 cps; pH 9.0 (as neutralized); polymer MW >200,000; Acid Number 40; dries to form glossy films that combine the fast-dry of emulsion polymers with the distinctness-of-image and gloss of water-based alkyd resin films; recommended as both a grinding vehicle and a letdown vehicle.

Primal E-1941 (Rohm & Haas)—milky-white polymer emulsion; 47.5% solids; pH 7.1; viscosity 1000–3000 cps; Minimum Film Formation Temperature 37° C.

EXAMPLE 3

Example 1 is repeated except that the toluene is replaced with equal parts by weight of 2-ethyhexyl acrylate obviating the need, as required in Example 1, to remove the toluene.

EXAMPLE 4

The polymer composition prepared in Example 3 is used in place of the Example 1 polymer composition in Examples 2A to 2Z (in Table 1). Satisfactory results are obtained.

EXAMPLE 5

Example 3 is repeated replacing the Novacure of Example 1 with an equal weight of Novacure 3700-25R, with similar results.

EXAMPLE 6

The polymer composition of Example 5 is used in place of the Example 1 polymer compositions in Examples 2AA to 2 MM (in Table 1). Satisfactory results are obtained.

EXAMPLE 7

Hydrocarbon Resin Emulsions. These were the hydrocarbon resin emulsions produced by Exxon Chemical Company under the trade name "Escorez." The hydrocarbon resins were prepared by cationic polymerization of a mixture of saturated and unsaturated C4–7 hydrocarbons to give oligomers of varying composition and M.W.'s above about 2,000 to below about 10,000. The hydrocarbon resins were then subjected to inverse emulsification with water to give the hydrocarbon resin emulsions. The solids content of these emulsions was ca. 53%. Emulsions were prepared of different hydrocarbon resins, which varied as to their content of aliphatic and aromatic constituents. The main current application of these hydrocarbon resin emulsions is as tackifier resins in combination with acrylate ester copolymer latexes in pressure-sensitive adhesives.

The hydrocarbon resin emulsion used by applicants was Escorez 9271. This hydrocarbon resin was made from a petroleum fraction 0f C4–7 hydrocarbons, and contained 70% aliphatic and 30% aromatic constituents. After the cationic polymerization, the resin contained an unknown concentration of double bonds, which were not polymerizable, according to Exxon.

The hydrocarbon resin emulsion had a low surface tension of 27.3 dyne/cm and dried to form a continuous film. The emulsion coagulated when the photoinitiators, or an organic solvent such as acetone were added; however, the emulsion could be diluted indefinitely with distilled-deionized water.

To stabilize the emulsion to the addition of photoinitiator, and to reduce the solids content to 40% (the concentration used for the earlier work on water-based ultraviolet light-cured inks), a dilute solution of an 80/20 mixture of Igepal CO-990FL (formerly GAF; now Rhone-Poulenc) and Triton X-45 (formerly Rohm & Haas; now Union Carbide) emulsifiers was added. 2% of this solution was sufficient to stabilize the emulsion at 40% solids.

Escorez ECR-346R (881030-4) hydrocarbon resin was reported to be the hydrocarbon resin used to prepare the Escorez 9271 hydrocarbon resin emulsion. This resin was a brittle yellow solid, similar in appearance to rosin. It had a density of ca. 0.6 g/cm$^3$.

10 g. Escorez ECR-346R resin was dissolved in 20 g. toluene to form a solution, and 5% photoinitiator (based on resin) was added (5% was used in place of the 2% used earlier to increase the rate of radical generation upon irradiation). The photoinitiators used were 2,2'-diethoxyacetophenone (Aldrich) or Irgacure 369 (Ciba-Geigy). 10–25% trimethylolpropane triacrylate (UCB Radcure) crosslinking monomer was added, and the resulting solution was placed on cleaned-glass plates (rinsed with 10% aqueous sodium hydroxide and distilled-deionized water, and dried).

When the dried solution was exposed to ultraviolet light (200 watt/in Hanovia lamp; 120 ft/sec belt speed), it cured to an opaque film. This film was scraped off the glass plate and placed in toluene. It failed to dissolve in several weeks, indicating that it was crosslinked. The hydrocarbon resin by itself without the trimethylolpropane triacrylate dissolved in toluene after irradiation, indicating that it did not crosslink in the solid state. The trimethylolpropane triacrylate certainly would have polymerized in any case, but the hydrocarbon resin was not expected to polymerize; however, the insolubility of the film combining the two indicated that the trimethylolpropane triacrylate and the hydrocarbon resin had copolymerized to form a crosslinked film.

Model ink formulations were prepared using the Escorez 9271 hydrocarbon resin emulsion and evaluated using the following recipe.

| Ingredient | Designation | Parts by Weight |
|---|---|---|
| Phthalo Blue Pigment Paste | Martin-Huwart P10293*** | 34.0 |
| Aqueous Wax Emulsion (27% wax) | Martin-Huwart W6686 | 8.0 |
| Water-Soluble Polymer* | | 15.0 |
| Hydrocarbon Resin Emulsion** | Exxon Escorez 9271 | 43.0 |

*Elotex 2030 (Enorex AG) or Joncryl SCX-2630 (S. C. Johnson)
**40% solids; 2% photoinitiator and 10% trimethylolpropane triacrylate based on solids.
***43.48% Heliogen Blau D7099 AQ/10.87% Joncryl 679/water.

This formulation was rolled out on the surface of high-density polyethylene, low-density polyethylene, polypropylene, polycarbonate and aluminum foil films using a Pamarco Handproofer. The ink films were then exposed to ultraviolet light (Hanovia 200 watt/in lamp; belt speed 120 ft/min) in 1–3 passes without any preliminary drying; there was little difference in the film properties as a function of the number of passes.

The adhesion of the cured ink films to the substrate was evaluated using the Scotch tape test; the mar resistance using the fingernail scratch test; and the water-sensitivity of the films using the humidity test. In the Scotch tape test, a 2–3 cm length of Scotch tape was applied to the ink film and then removed by pulling on the tape at a right angle to the ink film; the amount of the ink film removed by the Scotch tape was taken as an indication of the failure of adhesion. In the mar-resistance test, the ink film was scratched with a fingernail to determine its resistance to marring. In the water-sensitivity test, the printed ink films were aged for 72 hours at 100% relative humidity in a desiccator containing water; the films were then removed, and their adhesion to the substrate and mar resistance were evaluated. These tests were empirical, but are representative of the tests used in the field.

For the polycarbonate film and the aluminum foil, the adhesion to the substrate and the mar resistance were excellent, both before and after aging at 100% relative humidity for 72 hours. This excellent adhesion was attributed, at least in part, to the relatively polar —O—CO—O— groups of the polycarbonate. The surface of the aluminum foil was less well-known and must be characterized; it may be coated with a thin polymer film.

For the smooth, nonpolar, nonporous high-density polyethylene, low-density polyethylene, and polypropylene films, the rollouts were prepared using the Pamarco Handproofer and then exposed immediately to ultraviolet light (Hanovia 200/watt/in; belt speed 120 ft/min). The ink films on all three polyolefin films gave excellent adhesion and mar resistance, both before and after aging at 100% relative humidity for 72 hours. In addition, with the inks containing the Joncryl SCX-2630 water-soluble polymer, the films snowed excellent gloss, which has not been seen before with water-based printing ink films. The success in the polymerization of these hydrocarbon resins (which had been reported to be nonpolymerizable) was attributed to the high radical flux arising from the ultraviolet light irradiation.

EXAMPLE 8

Butadiene/Styrene Copolymer Latexes. This work used a 76.5/23.5 butadiene/styrene copolymer latex (No. R-222 SBR-1 502; Ameripol Synpol Co.). This latex was typical of those polymerized to ca. 60% conversion and then coagulated to produce synthetic rubber for automobile tires. The solids content was low (ca. 18%), and the particle size was small (ca. 60 nm; capillary hydrodynamic fractionation). The latex as received contained some chunks of coagulum, which were filtered out using cotton wool before use.

These copolymers contain residual unsaturation, about one double bond for each butadiene unit. These double bonds are of several stereoisomeric configurations, i.e. 65–70% trans-1,4-, 15–20% cis-1,4-, and 15–20% 1,2-vinyl-.

This SBR-1052 latex was relatively stable at its pH of 8; however, after storage for several weeks, it tended to cream to form small chunks floating on the top. Therefore, it was necessary to filter the latex again with cotton wool before using it in an ink formulation. The latex solids contents was still 18% after filtration to remove the cream layer.

Model ink formulations were prepared using the ca. 18%-solids butadiene/styrene copolymer latex and evaluated using the following recipe.

| Ingredient | Designation | Parts by Weight |
|---|---|---|
| Blue Pigment Paste | Martin-Huwart P10293 | 34.0 |
| Aqueous Wax Emulsion | Martin-Huwart W6686 | 8.0 |
| Water-Soluble Polymer | Enorex AG Elotex 2030 | 15.0 |
| Butadiene/Styrene Latex* | Ameripol Synpol SBR-1502 | 43.0 |

*18% solids; 2% photoinitiator and 25% trimethylolpropane triacrylate based on solids This formulation was rolled out on the surface of high-density polyethylene, low-density polyethylene, and polypropylene films using the Pamarco Handproofer. The ink films were then exposed to ultraviolet light (Hanovia 200 watt/in; belt speed 120 ft/min) without any preliminary drying for 1–3 passes; there was no significant differences as a function of the number of passes. The printability was not very good compared with the earlier samples because of the low solids content (18%).

The adhesion of the cured ink films to the substrate was evaluated using the Scotch tape test; the mar resistance using the fingernail scratch test; and the water-sensitivity of the films using the humidity test.

For the smooth, nonpolar, nonporous high-density polyethylene, low-density polyethylene, and polypropylene films, the roll outs were prepared using the Pamarco Handproofer and then exposed immediately to ultraviolet light (Hanovia 200/watt/in; belt speed 120 ft/min). The ink films on all three polyolefin films showed good adhesion and mar resistance, both before and after aging at 100% relative humidity for 72 hours. The abrasion resistance and washability were good.

EXAMPLE 9

Carboxy-Terminated Polybutadiene. Tests were also run using a carboxy-terminated polybutadiene oligomer (Scientific Polymer Products; MW $5.6 \times 10^3$). This polybutadiene was a viscous liquid that was soluble in dichloromethane.

2.1 g. of carboxy-terminated polybutadiene were dissolved in 4.2 g. dichloromethane to give a solution of ca. 33% solids content. 5% photoinitiator (0.11 g; based on polybutadiene) was added. The photoinitiators were 2,2'-diethoxyacetophenone (Aldrich) or Irgacure 369 (Ciba-Geigy). Trimethylolpropane triacrylate (UCB Radcure) was added to each sample in 0, 10%, and 25% concentration based or polybutadiene, and the resulting solutions were placed on glass plates that were cleaned as described earlier to give films of ca. 1 mm thickness. The glass plates were passed repeatedly for up to 50 passes under the ultraviolet lamp (Hanovia 200 watt/in; belt speed 120 ft/min). This irradiation was repeated as rapidly as possible; the samples were cooled periodically to avoid the buildup of heat. After irradiation, a piece of film was scraped off the glass plate and weighed (ca. 0.1 g) and added to dichloromethane (ca. 3.0 g) to determine if the film was soluble. The results are given in the following table.

| | | | Number of Passes | | | |
|---|---|---|---|---|---|---|
| Sample | Photo-Initiator | TMPTMA (%) | 10 | 25 | 50 | Sol. |
| A | 2,2'-DEAP | 0 | ? | bubble | tack film | I* |
| B | 2,2'-DEAP | 10 | ? | big bubble | solid film | I* |
| C | Irgacure 369 | 0 | ? | ? | tacky film | I* |
| D | Irgacure 369 | 10 | ? | film formed | solid film | I* |
| E | Irgacure 369 | 25 | film | solid film | minor crack | I* |
| F | none | 0 | — | — | — | S* |

*I = insoluble; S = soluble

The relatively great thickness (ca. 1 mm) required many passes under the ultraviolet lamp to cure the film. The samples without trimethylolpropane triacrylate formed a tacky film on the glass plate, but did not dissolve in dichloromethane. The samples with trimethylolpropane triacrylate all formed good solid films which swelled but did not dissolve in dichloromethane. Therefore, it was concluded that these samples were crosslinked and this polybutadiene should be emulsified and tested in this form.

Emulsions of this carboxy-terminated polybutadiene are included with pigment paste, wax and water-soluble polymer as described in Examples 7 and 8 with similar results.

EXAMPLE 10

| Aromatic Urethane-Acrylate Oligomer | |
|---|---|
| (a) Ingredients | Parts by weight |
| Aqueous sodium lauryl sulfate solution (20 mM) | 240.0 |
| Ebecryl 8700 urethane-acrylate oligomer* | 76.8 |
| Trimethylolpropane triacrylate crosslinking monomer | 19.2 |
| 2-Ethylhexyl acrylate monofunctional monomer | 64.0 |
| Hexadecane coemulsifier | 3.26 |

*Functionality 2.3; M.W. 1500; viscosity 6000 cps at 65° C.

2.31 g sodium lauryl sulfate was dissolved in 400.0 g water at room temperature to give the 20 mM stock solution of emulsifier. The Ebecryl 6700 and the 2-ethylhexyl acrylate were mixed in a water bath at about 65° C. to reduce the high viscosity of the oligomer. This lower-viscosity mixture was removed from the water bath, and the trimethylolpropane triacrylate and hexadecane were added and mixed to form the oil phase. This oil phase was added to the aqueous 20 mM sodium lauryl sulfate solution and mixed in a beaker with a magnetic stirrer for 30 minutes to form a crude emulsion. This emulsion was stirred in the Omni-Mixer at 16,000 rpm for 90 seconds and then subjected to ultrasonification for one minute to reduce the average droplet size to submiscopic size. To 50.0 g of this emulsion was added 0.40 g (2%) 2,2'-diethoxyacetophenone photoinitiator and the mixture was tumbled end-over-end in a capped bottle for one hour until the photoinitiator was completely mixed with emulsion.

(b) This Ebecryl 6700 emulsion was employed in the following model ink formulation in accordance with this invention:

| Ingredients | Parts by Weight |
| --- | --- |
| Blue pigment paste P10293 | 6.8 |
| Ebecryl 6700 urethane-acrylate emulsion | 8.6 |
| Aqueous Wax emulsion 6686/B (27% wax) | 1.6 |
| Elotex 2030 water-soluble polymer | 3.0 |

This model ink was drawn down on plastic film substrates and immediately exposed to ultraviolet light (Hanovia; 200 watt/in) at 150 foot/min. After one pass, the adhesion was very good for the low-density polyethylene and polypropylene, but poorer for high-density polyethylene. After three passes, the adhesion was excellent on all three substrates.

(c) The following formulation using Joncryl 8051 instead of the Elotex 2030 in (b) above gave similar results.

| Ingredient | Parts by Weight |
| --- | --- |
| Blue pigment paste P10293 | 6.8 |
| Ebecryl 6700 urethane-acrylate emulsion | 9.6 |
| Aqueous Wax emulsion 6686/B | 1.0 |
| Joncry 8051 water-soluble polymer | 2.6 |
| (d) The following formulation (3 parts) was used instead of the Elotex 2030 in (b) above. | |
| Elotex 2030 | 40.0 |
| Water | 3.0 |
| Aqueous ammonia (28%) | 1.0 |
| Acrysol RM-5 (Rohm & Haas) | 2.0 |

The Acrysol RM-5 was added to the rest of the mixture with stirring, to give a very viscous, smooth solution. The adhesion to the plastic film substrates was improved.

Acrysol RM-5 is an associative thickener used as a viscosity modifier in the inks of this invention. "Associative thickener" is a term applied to water soluble or water dispersible polymers the molecules of which associate with each other in aqueous solution or dispersion, to give the requisite rheological properties. Thus, these thickeners depend less on specific interactions with the functional groups on the latex particles and give the same rheological properties with all latexes, independent of their type and composition.

This Acrysol RM-5 is a milky white liquid of 30% solids content, 100 cps Brookfield viscosity (#1 spindle, 60 rpm), and pH 2.2–3.2 presumably prepared by emulsion polymerization using carboxyl-containing monomers.

It is used after neutralization to pH 8.0–8.5, and reportedly has a higher high-shear-rate viscosity and a lower low-shear-rate viscosity (and thus should show a smaller overall decrease in viscosity with increasing shear rate).

Following are further experiments using different oligomers with vinyl functionality.

Oilgomers with Vinyl Functionality

EXAMPLE 11

Carboxyl-terminated polybutadiene (Scientific Polymer Products; 1.9% Carboxyl content; 11/12/87, Catalog #524 CAS #68891-79-2; MW ca. 5700). The crosslinking of this oligomer from organic solvent solution in presence of trimethylolpropane triacrylate is described earlier in Example 9. The present experiments describe the crosslinking from aqueous emulsion as in the present invention.

EXAMPLE 12

Aromatic Urethane Acrylate Oligomer: Ebecryl 220 resin (multifunctional aromatic urethane acrylate containing an acrylated polyol; functionality 6, MW 800; viscosity 28000 cps at 25° C.; Tg 49° C.; combines fast cure with excellent hardness and solvent resistance).

EXAMPLE 13

Aliphatic Urethane Acrylate Oligomer: Ebecryl 230 resin (aliphatic urethane diacrylate; functionality 2; MW 5000; viscosity 40000 cps at 25° C.; Tg −55, −39; cures to soft, flexible film).

EXAMPLE 14

Acrylic Oligomer: Ebecryl 745 (acrylic oligomer diluted with 46% monomer blend: viscosity 30000 cps at 25° C.; $T_g$ 30° C.; designed to give improved adhesion to difficult substrates).

EXAMPLE 15

Polyester Acrylate Oligomer: Ebecryl 810 (multifunctional polyester acrylate; functionality 4; MW 1000; viscosity 550 cps at 25° C.; acid value 17; $T_g$ 31° C.; general-purpose fast-curing resin with low viscosity).

Monofunctional Monomer

ODA: octyl/decyl acrylate mixture of monofunctional monomers of linear eight and ten carbon acrylate esters.

Preparation of the Miniemulsions

The miniemulsions were prepared by stirring the oil phase containing the Ebecryl 810, hexadecane, trimethylolpropane triacrylate, and 2-ethylhexyl acrylate into the aqueous phase containing the sodium lauryl sulfate, and then subjecting this crude emulsion in 50 ml portions to ultrasonification (Ultrasonifier Model W-350, Branson Sonic Power). The Ebecryl 810 was used because of its low viscosity.

Table I gives the recipe used in these experiments.

TABLE 1

Recipe for Preparation of Miniemulsions

| Ingredient | Parts by Weight |
| --- | --- |
| Water containing 20 mM sodium lauryl sulfate | 160.07 |
| Ebecryl 810 resin | 51.49 |
| Hexadecane | 2.19 |
| Trimethylolpropane triacrylate | 12.91 |
| 2-Ethylhexyl acrylate | 42.83 |

Table II gives the average particle size measured by photon correlation spectroscopy (Nicomp). There was little difference in the average particle size measured initially. An ultrasonification time of 4 minutes was selected because this time ensured that the ultrasonification was complete; moreover, the distribution at 4 minutes was narrower than at the earlier times.

TABLE II

Particle Size of Ebecryl 810 Miniemulsions

| Ultrasonification Time (min) | Initial Particle Size (nm) | After 96 Hours (nm) |
|---|---|---|
| 1 | 260 | 437 |
| 2 | 241 | 387 |
| 4 | 241 | 378 |
| 8 | 234 | 377 |

Table III gives the recipes for the miniemulsions. The aqueous stock solution containing 20 mM sodium lauryl sulfate was prepared. Then, the oil phase containing the oligomer, hexadecane, trimethylolpropane triacrylate, and 2-ethylhexyl acrylate (or the octyl/decyl acrylate mixture in one case) was stirred into the water phase using a magnetic stirrer to make the crude emulsion. The crude emulsion was then subjected to ultrasonification for 4 minutes (50% duty cycle, power level 7).

TABLE III

Recipes for the Miniemulsions

| Ex. | Oligomer | Water* (g) | Oligomer (g) | HD** (g) | TMPTA*** (g) | 2-EHA**** (g) |
|---|---|---|---|---|---|---|
| 11 | Polybutadiene | 80.01 | 25.60 | 1.10 | 6.41 | 21.30 |
| 12 | Ebecryl 220 | 80.00 | 25.72 | 1.11 | 6.47 | 21.29 |
| 13 | Ebecryl 230 | 80.01 | 25.64 | 1.09 | 6.39 | 21.70 |
| 14 | Ebecryl 745 | 80.02 | 25.52 | 1.09 | 6.40 | 21.50 |
| 15 | Ebecryl 810 | 160.07 | 51.49 | 2.19 | 12.91 | 42.83 |
| 12a | Ebecryl 220***** | 80.01 | 25.57 | 1.09 | 6.44 | 21.30 |

*water containing 20 mM sodium lauryl sulfate
**hexadecane
***trimethylolpropane triacrylate
****2-ethylhexyl acrylate
*****used ODA monomer in place of 2-ethylhexyl acrylate Printing on Plastic Film The photoinitiator was then added; 2% of 2,2'-diethoxyacetophenone based on oil phase was added to each miniemulsion, and the samples were tumbled in capped bottles for one hour at room temperature to allow the photoinitiator to swell the oligomer emulsion particles.

Table IV gives the recipes for the model inks. All of the miniemulsions were formulated with the P10293 Blue Pigment Paste, wax emulsion 6686/B, and the Elotex 2030 water-soluble polymer used to adjust the rheology. The model inks were then rolled out on high-density polyethylene, low-density polyethylene, and polypropylene films using the Pamarco handproofer and cured by passing on a belt moving at 130 ft/min under the Hanovia 200 watt/inch lamp.

TABLE IV

Formulation for Model Inks

| Ingredients | (g) | Parts by Weight |
|---|---|---|
| Blue Pigment Paste P10293 | 6.8 | 34.0 |
| Aqueous Wax Emulsion 6686/B | 1.6 | 8.0 |
| Elotex 2030 | 3.0 | 15.0 |
| Miniemulsion | 8.6 | 43.0 |

The cured ink films on the plastic film substrates were then tested for adhesion using the scotch tape test after one and three passes under the ultraviolet lamp, for mar resistance using the fingernail test, and for water resistance after aging for two days at high humidity. Table V gives the test results.

Overall, the Ebecryl 745 showed the best results among the resins tested in this series. It showed very good adhesion on all three plastic films using the Scotch tape tests. Ebecryl 230 showed excellent adhesion to the polypropylene film. All of the other resins showed reasonably acceptable results.

TABLE V

Ink Film Adhesion, Mar Resistance, and Water Resistance

| | HDPE* | LDPE** | PP*** |
|---|---|---|---|
| Polybutadiene Example 11 | | | |
| Printability Scotch tape | good | good | fair |

TABLE V-continued

Ink Film Adhesion, Mar Resistance, and Water Resistance

| | HDPE* | LDPE** | PP*** |
|---|---|---|---|
| 1 pass | poor–fair | poor–fair | fair |
| 3 passes | poor–fair | poor–fair | fair |
| Mar resistance | poor | fair | good |
| Water resistance | very good | fair | fair |
| Ebecryl 220 - Example 12 | | | |
| Printability Scotch tape | good | fair | fair |
| 1 pass | fair | poor | fair |
| 3 passes | good | fair | good |
| Mar resistance | very good | good | good |
| Water resistance | poor | poor | good |
| Ebecryl 230 - Example 13 | | | |
| Printability Scotch tape | good | fair | poor |
| 1 pass | good | fair | excellent |
| 3 pases | good | fair | excellent |
| Mar resistance | very good | very good | very good |
| Water resistance | good | good | good |
| Ebecryl 745 - Example 14 | | | |

TABLE V-continued

Ink Film Adhesion, Mar Resistance, and Water Resistance

|  | HDPE* | LDPE** | PP*** |
|---|---|---|---|
| Printability Scotch tape | good | good | good |
| 1 pass | good | fair | very good |
| 3 passes | very good–excel. | good | very good–excel. |
| Mar resistance | good | very good | very good |
| Water resistance | very good | very good | very good |
| Ebecryl 220/ODA-Example 12a |  |  |  |
| Printability Scotch tape | good | good | good |
| 1 pass | poor | fair | good |
| 3 passes | poor | good | very good |
| mar resistance | poor | fair | good |
| Water resistance | very good | poor | good |
| Ebecryl 810 - Example 15 |  |  |  |
| Printability Scotch tape | very good | fair | fair |
| 1 pass | poor–fair | poor | poor |
| 3 passes | poor–fair | poor | poor |
| Mar resistance | poor | poor | poor |
| Water resistance | poor | poor | poor |

*high-density polyethylene
**low-density polyethylene
***polypropylene

This invention has been disclosed with respect to preferred embodiments thereof and it will be understood that modifications and variations obvious to those skilled in the art are to be included within the spirit and purview of this application and the scope of the appended claims.

The terms "UV" and "M.W." (or "MW") appearing herein and in the appended claims signify, respectively, "ultraviolet radiation" and "molecular weight." The terms "monofunctional monomer" and "polyfunctional monomer" appearing herein and in the appended claims signify, respectively, "monoethylenically unsaturated monomer" and "polyethylenically unsaturated monomer".

What is claimed is:

1. An aqueous printing ink composition substantially devoid of volatile organic solvents, having a viscosity of about 10 to 50 poises and useful for gravure and flexographic printing on hydrophobic smooth, non-porous plastic and metal substrates prepared by:
   A. dispersing a low molecular weight hydrophobic ultraviolet curable vinyl functional oligomer in an aqueous medium in the presence of an oil-in-water emulsifier-coemulsifier combination in which the molar ratio of emulsifier to coemulsifier is about 4:1 to 1:4, and subjecting the resulting crude aqueous oligomer emulsion to the action of comminuting forces sufficient to reduce the average particle sizes of the oligomer below about 1 micron and below the critical particle diameter which in practice will never settle, and wherein
      I. said emulsifier comprises a nonionic, anionic, cationic, amphoteric or zwitterionic surfactant or any mixture thereof,
      II. said coemulsifier comprises a water insoluble hydrocarbon or hydrocarbyl alcohol, ester, ether, amine or halide containing an aliphatic hydrocarbyl moiety of at least 8 carbon atoms, or any mixture thereof, and
      III. the aqueous oligomer emulsion comprises an effective amount of a photo initiator/photosensitizer;
   B. mixing a water insoluble pigment with water in the presence of a water soluble polymeric grinding vehicle and grinding the mixture to produce a ground pigment master batch paste,
   C. mixing the aqueous oligomer emulsion from A with the said ground pigment master batch paste, and
   D. adding to the mixture from C about 1 to 10% by weight of the printing ink composition of a water soluble or water reducible polymeric thickener effective to adjust the rheology properties of the final printing ink composition to sustain a rapid decrease in viscosity with increasing rate of shear to a plateau value of about 205 poises at high shear rate of about $10^{-4}$–$10^{-3}$ reciprocal seconds followed by a corresponding increase in viscosity upon cessation of the shear.

2. A composition as defined in claim 1 wherein there is present in said oligomer emulsion a crosslinking polyethylenically unsaturated monomer reactive with said oligomer.

3. A composition as defined in claim 2 wherein there is present in said oligomer emulsion a monoethylenically unsaturated monomer polymerizable under ultra-violet radiation.

4. A composition as defined in claim 3 wherein the emulsifier is selected from mono $C_{10}$ to $C_{20}$ alkyl, tri lower alkyl quaternary ammonium halides and $C_{10}$ to $C_{20}$ alkyl sulfates and the coemulsifier is selected from $C_{10}$ to $C_{20}$ alkanols, esters, ethers, halides and amines, and aliphatic hydrocarbons of at least 8 carbon atoms, the emulsifier and coemulsifier each having molecular weights of less than about 2000.

5. A composition as defined in claim 4 wherein the oligomer, polyethylenically unsaturated cross-linking agent and monoethylenically unsaturated monomer content ranges from about 10 to about 50% by weight; the emulsifier combination content from about 0.25 to about 5% by weight; the photo initiator/photosensitizer content from about 0.5 to about 5% by weight based on the weight of oligomers and monomers; the pigment content from about 5 to 25% by weight; and including fron about 1 to 10% by of a water soluble polymeric thickener.

6. A composition as defined in claim 2 wherein the polyethylenically unsaturated monomer comprises a di-, tri-, tetra- or penta-acrylate.

7. A composition as defined in claim 6 including a monoethylenically unsaturated monomer selected from the group consisting of acrylates, methacrylates, vinyl esters and vinyl pyrrolidone.

8. A composition as defined in claim 1 wherein the emulsifier-coemulsifier combination comprises a sodium salt of a $C_{10}$ to $C_{20}$ alkyl sulfate and a $C_{10}$–$C_{20}$ alkanol in a molar ratio of about 1:1 to 1:4.

9. A composition as defined in claim 8 wherein the said combination comprises sodium lauryl sulfate and cetyl alcohol in a molar ratio of about 1:4.

10. A composition as defined in claim 1 wherein the emulsifier-co-emulsifier combination comprises a quaternary ammonium halide and a $C_{10}$ to $C_{20}$ alkanol in a molar ratio of about 1:1 to 1:4.

11. A composition as defined in claim 10 wherein the said combination comprises hexadecyl trimethyl ammonium bromide and cetyl alcohol in a molar ratio of about 1:4.

12. A composition as defined in claim 1 wherein the emulsifier comprises a sodium $C_1$–$C_{20}$ alkyl sulfate and the coemulsifier comprises an aliphatic hydrocarbon of at least 8 carbon atoms in a molar ratio of about 1:1 to 1:3.

13. A composition as defined in claim 12 wherein the emulsifier comprises sodium lauryl sulfate and the coemulsifier comprises hexadecane in a molar ratio of about 1:3.

14. A composition according to claim 1 wherein said polymeric thickener comprises an associative thickener containing a mixture of water soluble or water reducible polymers, the molecules of which associate more with each other than with the functional groups on the latex particles in the oligomer emulsion to give said printing ink composition said rheological properties.

15. An aqueous printing ink composition substantially devoid of volatile organic solvents, having a viscosity of about 10 to 50 poises and useful for gravure and flexographic printing on hydrophobic smooth, non-porous plastic and metal substrates, prepared by:
   A. mixing a water insoluble pigment with water in the presence of a water soluble polymeric grinding vehicle and grinding the mixture to produce a ground pigment master batch paste,
   B. mixing the ground pigment master batch paste with
      I. an aqueous emulsion of ion molecular weight hydrocarbon resin oligomers prepared by cationic polymerization of a mixture of $C_4$ to $C_7$ hydrocarbons, and further containing a photoinitiator and a cross-linking polyethylenically unsaturated monomer, or
      II. an aqueous butadiene/styrene copolymer latex emulsion polymerized to about 60% conversion and containing about one double bond for each butadiene unit, and further containing a photoinitiator and a cross-linking polyethylenically unsaturated monomer, and
   C. adding to the resulting mixture about 1% to 10% by weight of the printing ink composition of a water soluble or water reducible polymeric thickener effective to adjust the rheology properties of the final ink composition to sustain a rapid decrease in viscosity with increasing rate of shear to a plateau value of about 2–5 poises at high shear rate of $10^{-3}$ to $10^{-4}$ reciprocal seconds followed by a corresponding increase in viscosity upon cessation of the shear.

16. A composition according to claim 15 wherein said polymeric thickener comprises an associative thickener containing a mixture of water soluble or water reducible polymers, the molecules of which associate more with each other than with the functional groups on the latex particles in the water insoluble polymer emulsion to give said ink said rheology properties.

* * * * *